United States Patent [19]

Vink et al.

[11] Patent Number: 4,633,415

[45] Date of Patent: Dec. 30, 1986

[54] WINDOWING AND SCROLLING FOR A CATHODE-RAY TUBE DISPLAY

[75] Inventors: Anthony B. Vink, Canton; Edward F. Asam, Ann Arbor; Dewayne J. Ferris, Brighton, all of Mich.

[73] Assignee: Northern Telecom Limited, Montreal, Canada

[21] Appl. No.: 619,373

[22] Filed: Jun. 11, 1984

[51] Int. Cl.[4] .......... G06F 3/14; G09G 1/00

[52] U.S. Cl. .......... 364/521; 364/518; 340/747

[58] Field of Search .......... 364/521, 518; 340/747

[56] References Cited

U.S. PATENT DOCUMENTS

| | | | |
|---|---|---|---|
| 3,683,359 | 8/1972 | Kleinschnitz | 340/324 A |
| 3,792,462 | 2/1974 | Casey et al. | 340/726 |
| 3,903,510 | 9/1975 | Zobel | 340/172.5 |
| 4,141,003 | 2/1979 | Felsenstein | 340/799 |
| 4,284,988 | 8/1981 | Seitz et al. | 340/726 |
| 4,342,991 | 8/1982 | Pope et al. | 340/726 |
| 4,375,638 | 3/1983 | O'Keefe et al. | 340/726 |
| 4,386,410 | 5/1983 | Pandya et al. | 364/518 |
| 4,412,294 | 10/1983 | Watts et al. | 364/518 |
| 4,454,593 | 6/1984 | Fleming et al. | 340/723 |
| 4,471,349 | 9/1984 | Strolle | 340/727 |
| 4,492,956 | 1/1985 | Collmeyer et al. | 340/747 |
| 4,542,376 | 9/1985 | Bass et al. | 364/521 |
| 4,550,315 | 10/1985 | Bass et al. | 340/747 |
| 4,559,533 | 12/1985 | Bass et al. | 340/724 |

*Primary Examiner*—Errol A. Krass
*Assistant Examiner*—Danielle B. Laibowitz
*Attorney, Agent, or Firm*—Schwartz, Jeffery, Schwaab, Mack, Blumenthal & Evans

[57] ABSTRACT

A method and a circuit for producing an independent scrollable display region (sometimes referred to as a "window") on the face of a cathode-ray tube (CRT) in a bit-mapped data display system is disclosed. Circuitry is provided to detect the presence of the window along a vertical axis and to detect the presence of the window along a horizontal axis. When both a vertical and a horizontal presence are detected simultaneously, a window is deemed to be present. When the window is deemed to be present a memory address selection circuit selects memory addresses from one memory address circuit and when the window is deemed to be not present, the memory address selection circuit selects memory addresses from another memory address circuit.

5 Claims, 4 Drawing Figures

WINDOWING AND SCROLLING FOR A CATHODE-RAY TUBE DISPLAY

BACKGROUND OF THE INVENTION

This invention relates generally to the provision of an independent scrollable display region (sometimes referred to as a "window") in a cathode-ray tube (CRT) display and to the provision of scrolling in the aforesaid window. More particularly, the present invention relates to a relatively simple circuit for providing both the windowing and the scrolling in a bit-mapped data display system.

Many schemes exist in the prior art for providing both a window function and a scrolling function U.S. Pat. No. 4,342,991 dated Aug. 3, 1982 by Richard N. Pope et al entitled "Partial Scrolling Video Generator" describes a scrolling system. Stated at the top of column 3 of this patent, the scrolling is accomplished by eliminating the refresh memory addressing from the CRTC (cathode-ray tube controller) of conventional design and substituting a presettable binary counter as a refresh address counter and an indirect address counter which alternatively access the address input of a refresh memory through a first multiplexer.

U.S. Pat. No. 4,284,988 dated Aug. 18, 1981 by Charles L. Seitz et al entitled "Control Means to Provide Slow Scrolling Positioning and Spacing in a Digital Video Display System" describes another means of providing a scrolling function. As described in column 11 of that patent, a character wheel is employed and three parameters (namely, the initial position, the count, and the mask) are loaded into respective registers at the beginning of each character line. By adjusting these parameters, the initial scan lines of the character line can be deleted with the remaining scan lines automatically moving up with additional scan lines being added at the bottom of the character space, and the character consequently appears to move up.

Another scheme is described in U.S. Pat. No. 4,375,638 dated Mar. 1, 1983 by David B. O'Keefe et al entitled "Scrolling Display Refresh Memory Address Generation Apparatus". As stated in column 2 of that patent, beginning at line 61, rows of character information are stored in fixed length rows in the display controller refresh memory. The display controller includes a roll register which is loaded with the value corresponding to the number of rows that the information on the display screen is to be rolled (scrolled) and this value is used in generating a relocated address which is used to retrieve the character information stored in the refresh memory.

Still other patents relating to this field include: U.S. Pat. No. 4,386,410 dated May 31, 1983 by Y.C. Pandya et al entitled "Display Controller For Multiple Scrolling Regions"; U.S. Pat. No. 4,412,294 dated Oct. 25, 1983 by L.F. Watts et al entitled "Display System With Multiple Scrolling Regions"; U.S. Pat. No. 4,141,003 dated Feb. 20, 1979 by L. Felsenstein entitled "Control Device For Video Display Module"; U.S. Pat. No. 3,903,510 dated Sept. 2, 1975 by G.C. Zobel entitled "Scrollin Circuit For a Visual Display Apparatus"; and U.S. Pat. No. 3,683,359 dated Aug. 8, 1972 by A.J. Kleinschnitz entitled "Video Display Terminal With Automatic Paging".

SUMMARY OF THE INVENTION

The present invention is directed to the provision of a window in a display on a CRT display device coupled with the provision of scrolling in the window. The present invention achieves this by providing a window detection circuit which is used to control a multiplexer; the multiplexer is employed to select one of two possible addresses. The address can be either that from the non-window display or that from the window display. The window detection circuit, in simplistic terms, functions by monitoring the CRT display in both a vertical and a horizontal direction. It produces a predetermined signal when both the display in the horizontal direction indicates a window, and the display in the vertical direction indicates a window.

Stated in other terms, the present invention is a control circuit for producing an independent, scrollable display region on the face of a cathode-ray tube (CRT) in a bit-mapped data display system, the control circuit comprising: a first vertical boundary detection means for detecting the beginning of the independent display region along a vertical axis; a second vertical boundary detection means for detecting the finish of the independent display region along the vertical axis; a first horizontal boundary detection means for detecting the beginning of the independent display region along a horizontal axis; a second horizontal detection means for detecting the finish of the independent display region along the horizontal axis; control means responsive to the first and second vertical boundary detection means and to the first and second horizontal boundary detection means for producing a binary signal having a first value indicative of the independent display region existing and having a second value indicative of the independent display region not existing; and memory address selection means for selecting, in response to the binary signal, either a memory address pertaining to the independent display region or a memory address not pertaining to the independent display region.

Stated in yet other terms, the present invention is a method for producing an independent scrollable display region on the face of a cathode-ray tube (CRT) in a bit-mapped data display system, the method comprising: producing a first binary signal having a first state indicative of the independent region existing along a first axis and having a second state indicative of the independent region not existing along the first axis; producing a second binary signal having a first state indicative of the independent region existing along a second axis and having a second state indicative of the independent region not existing along the second axis; combining the first and second binary signals so as to produce a third binary signal having a first state indicative of the independent region existing when both the first and second binary signals are in their first state and having a second state indicative of the independent region not existing when both the first and second binary signals are not both in their first state; and selecting either a first address source or a second address source in response to the third binary signal.

DESCRIPTION OF THE DRAWINGS

The present invention will now be described in more detail with reference to the accompanying drawings wherein like parts in each of the several figures are identified by the same reference character, and wherein.

DETAILED DESCRIPTION

Figure 1:
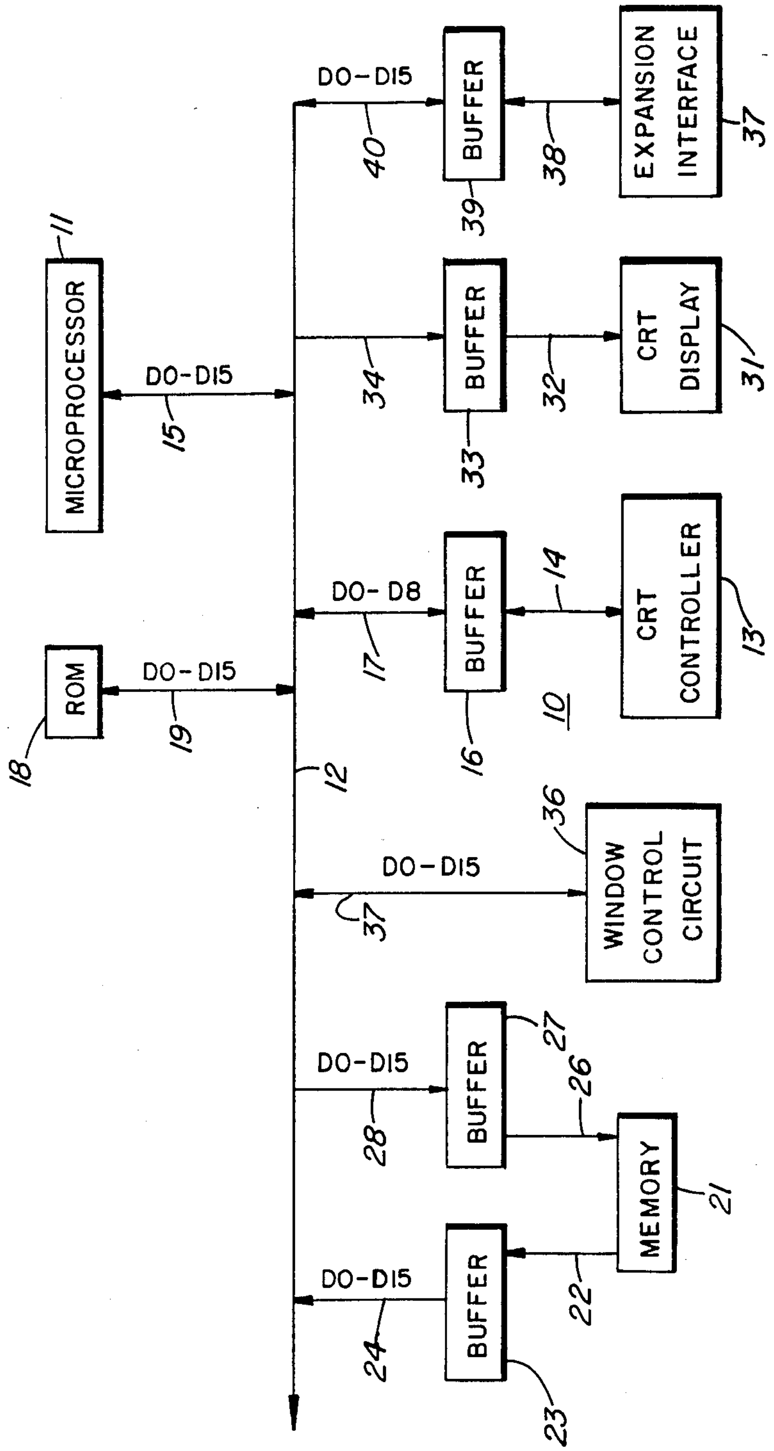
FIG. 1 is a simplified overall block diagram of a CRT display unit showing the interconnection of the major components.

FIG. 1 depicts a simplified representation of computer system 10 including window control circuit 36 constructed according to the present invention for providing windowing and scrolling on CRT display 31. System 10 is under the control of microprocessor 11 which is a 68000 microprocessor manufactured by Motorola. Microprocessor 11 communicates via a sixteen bit data bus 15 to sixteen bit bus 12. Aside from microprocessor 11, the major components of system 10 are a CRT controller 13, which is a Model 2674 manufactured by Signetics and is connected to bus 12 via eight bit bus 14, buffer 16, and eight bit bus 17. ROM (Read Only Memory) 18 (example 2764A) is connected to bus 12 via a sixteen bit bus 19. The purpose of ROM 18 is to provide firmware code for microprocessor 11.

Memory 21 is composed of 12 K bytes of random access memory (RAM). Memory 21 is interfaced to bus 12 via sixteen bit bus 22, buffer 23, sixteen bit bus 24 and via sixteen bit bus 26, buffer 27, and sixteen bit bus 28. CRT display 31 is connected to bus 12 via bus 32, buffer 33, and bus 34. CRT display 31 includes not only the CRT itself, but also the normal ancillary devices associated with providing the display. Window control circuit 36 is connected to bus 12 via sixteen bit bi-directional bus 37. Window control circuit 36 provides the control functions for the windowing and the scrolling to be described in more detail later in this specification. Additional capabilities are provided by expansion interface 37 connected to bus 12, via bi-directional bus 38, buffer 39, and bi-directional bus 40.

Figure 2:
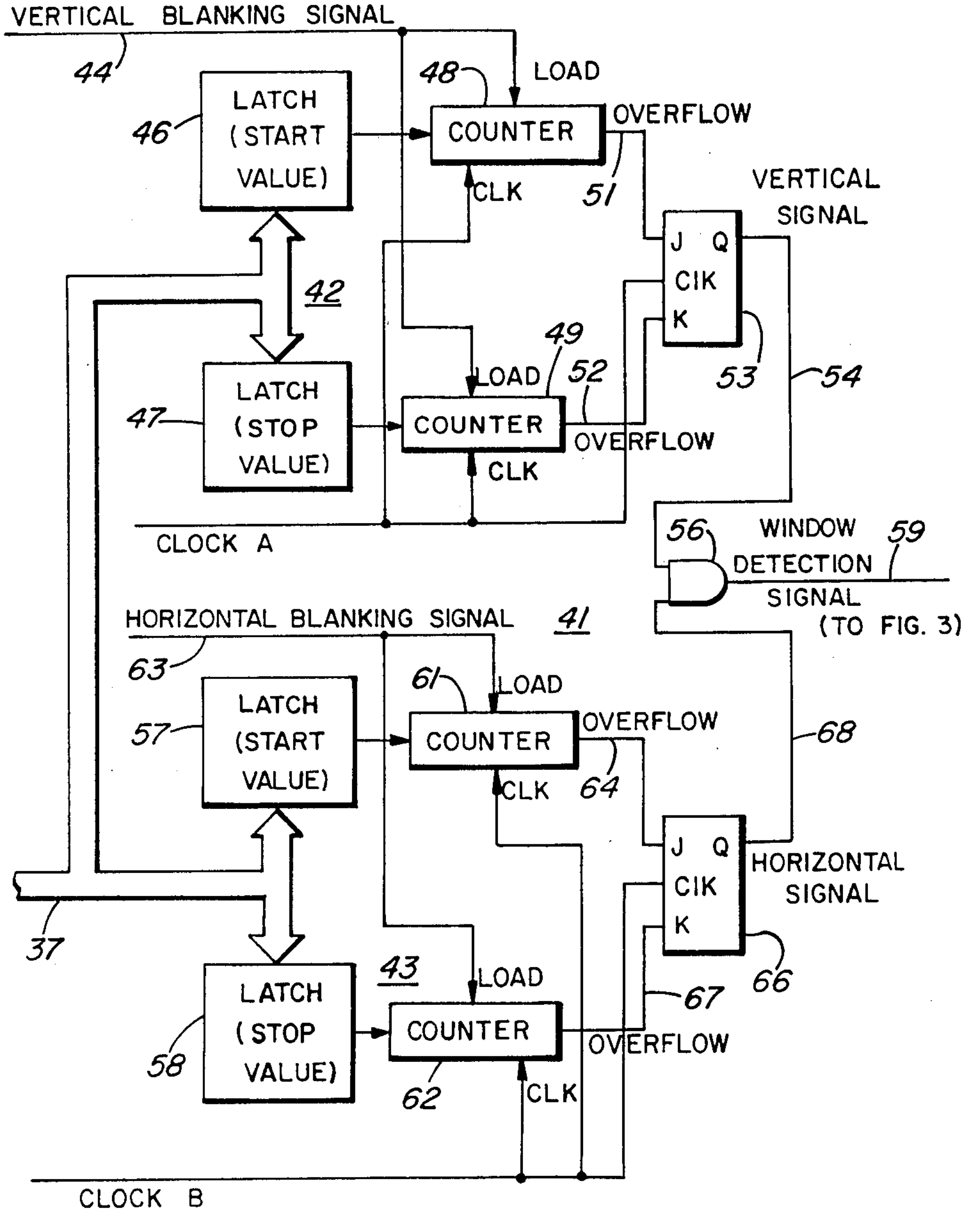
FIG. 2 is a simplified block diagram depicting the circuitry for determining window detection signals.
Figure 3:
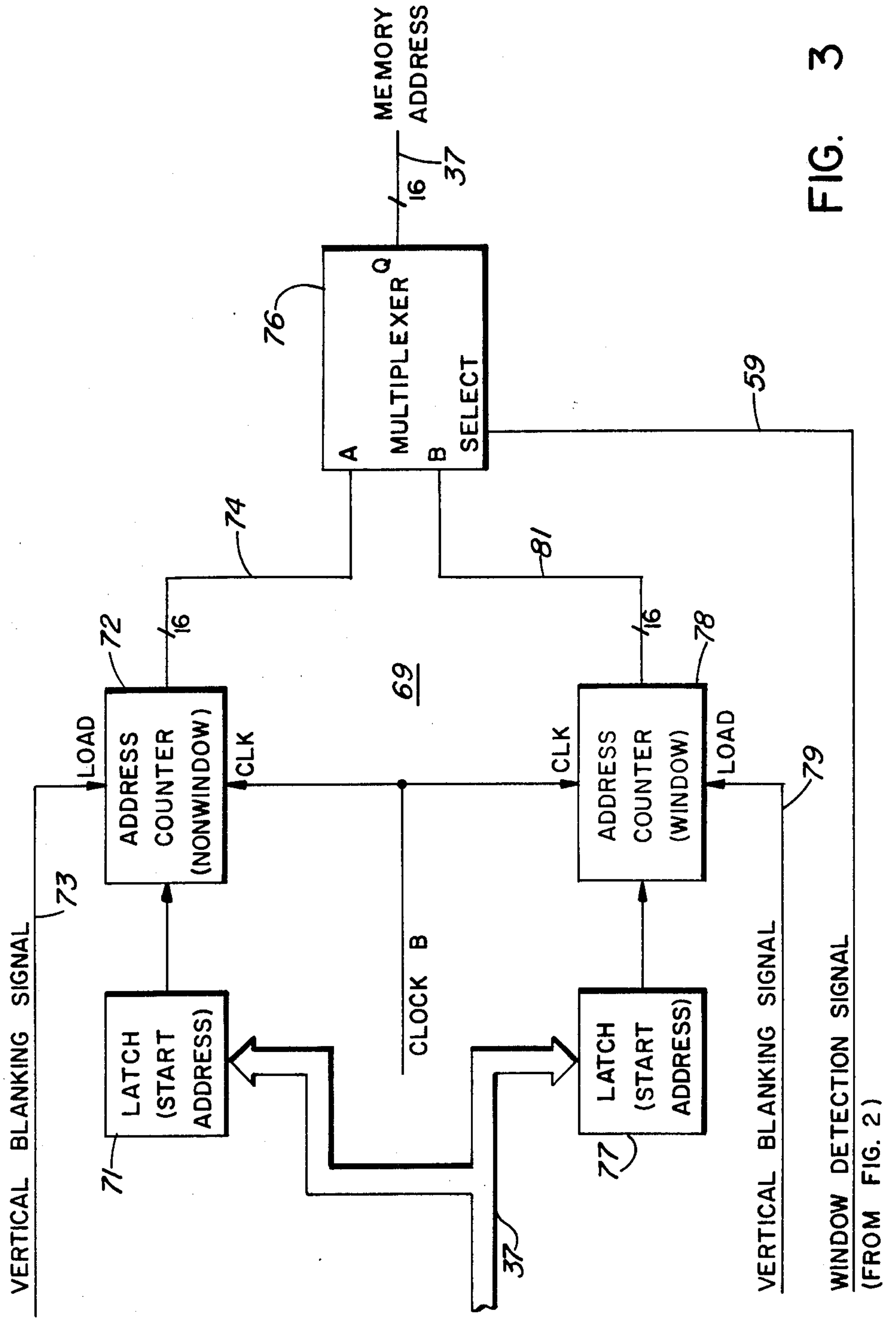
FIG. 3 is a simplified block diagram depicting the selection of memory address from either the window or the non-window address counter.
Figure 4:
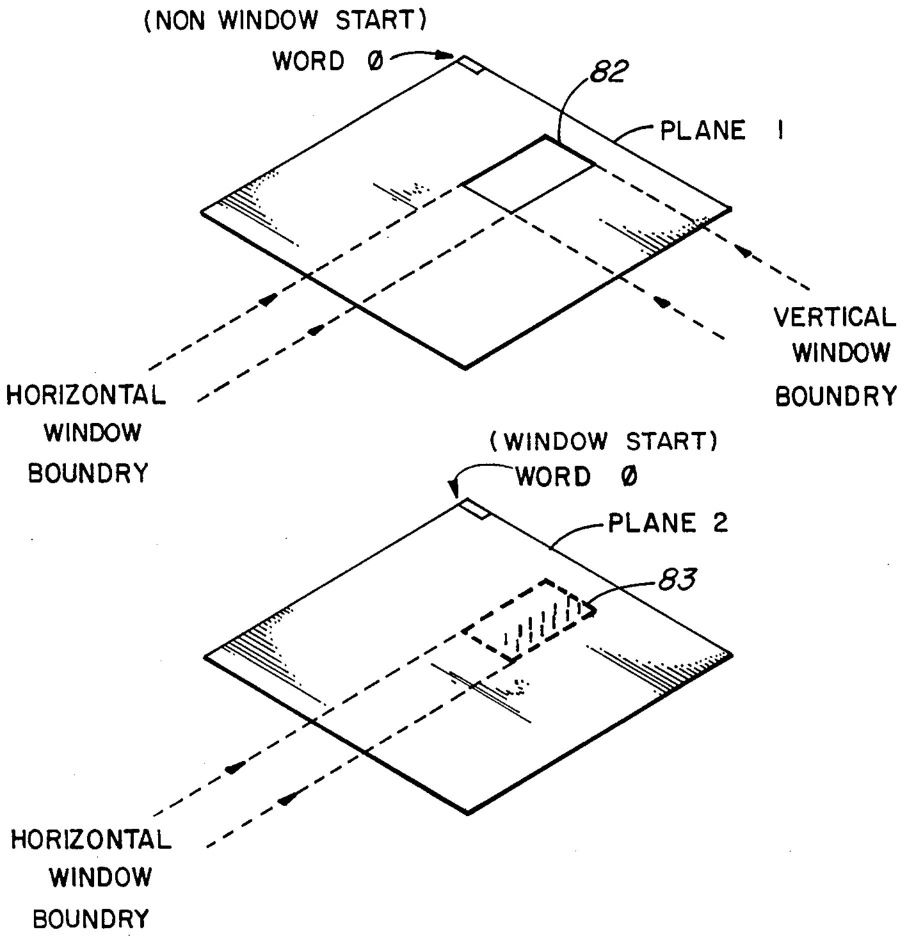
FIG. 4 is a stylized representation of two planes of memory (one the window memory, one the non-window memory) solely to aid in visualizing the concept behind the operation of the present invention.

Window detection circuit 36 will now be described in more detail. FIGS. 2 and 3 together comprise the circuitry indicated as window control circuit 36 in FIG. 1. Before returning to FIGS. 2 and 3 to describe the circuitry, it may be of value to look at FIG. 4 to see conceptually what is being done. FIG. 4 depicts two memory planes, referred to as plane 1 and plane 2. Plane 1 is a stylized representation of an area in memory whose contents would be displayed upon the face of the CRT (i.e. non-window memory). Plane 2 is a stylized representation of an area in memory whose contents would be displayed in windows on the face of the CRT (i.e. window memory). In plane 1, the window is represented by the solid rectangle 82 within the bounds of plane 1. All of the information that resides in the memory composing plane 1 would be displayed upon the face of the CRT except for that information within the bounds of the solid rectangle 82. Similarly, plane 2 would display only that information within the bounds of the dotted rectangle 83 shown on its face. In other words, the solid rectangle 82 in plane 1 corresponds with the dotted rectangle 83 on plane 2, and the information without the rectangle 82 in plane 1 is displayed, and only that information within the rectangle 83 in plane 2 is displayed. As is also depicted in FIG. 4, the rectangle 82 (i.e. window), in plane 1 has a horizontal window boundary indicated towards the lower part of the page, and a vertical window boundary, indicated towards the side of the page. The circuitry that will be discussed in relation to FIGS. 2 and 3 will be circuitry that first of all determines both the horizontal boundary, and the vertical boundary, and when these two boundaries coincide, a window is declared to exist. When the window is declared to exist, the address for the memory that is to be displayed on the CRT is taken from plane 2. When a window is declared not to exist, then the memory in plane 1 is addressed.

FIG. 2 depicts window detection circuit 41 interconnected as shown in the Figure, to which attention is directed. Vertical boundary detection circuit 42, detects the vertical boundaries of the window, while horizontal boundary detection circuit 43 detects the horizontal boundaries of the window. Vertical boundary detection circuit 42 functions as follows. Latch 46 (e.g. 7474's by Motorola) is loaded with a start value from microprocessor 11 (FIG. 1) via bus 37. Similarly, latch 47 (e.g. 7474's) is loaded with a stop value from microprocessor 11 (FIG. 1) via bus 37. Counter 48 is loaded with an initial value from latch 46 under the control of a vertical blanking signal on lead 44, applied to the load input of counter 48. Counter 48 is a Model 74161 manufactured by Motorola. Counter 49 is loaded with an initial value from latch 47 under the control of the vertical blanking signal on lead 44 applied to its load input. Counter 49 is a Model 74161 manufactured by Motorola. The value stored in latch 46 is such that counter 48 overflows at the desired point (i.e. where the vertical window boundary is to begin). Similarly, counter 49 is loaded with a value from latch 47, such that counter 49 overflows at the desired point (i.e. where the vertical window boundary is to terminate). Overflow signal from counter 48 is applied to the J-input of flip-flop 53 (e.g. 74109) by lead 51. The overflow signal from counter 49 on lead 52 is applied to the K-input of flip-flop 53. The Q-output of flip-flop 53 is a logic 1 signal when a window is deemed present and a logic 0 signal when a window is deemed not present. The Q-output of flip-flop 53 is applied to one input of AND gate 56 via lead 54.

Horizontal boundary detection circuit 43 operates in a similar fashion to circuit 42. Latch 57 (e.g. 7474's) is loaded with a start value from microprocessor 11 (FIG. 1) via bus 37. Similarly, latch 58 (e.g. 7474's) is loaded with a stop value from microprocessor 11 (FIG. 1) via bus 37. Counter 61 (e.g. a 74161) is loaded with an initial value from latch 57, under control of the horizontal blanking signal on lead 63 applied to the load input of counter 61. The initial value applied to counter 61, from latch 57, is such that overflow occurs at the desired point i.e. where the horizontal window boundary is to start. Similarly, counter 62 (e.g. a 74161) is loaded with an initial value from latch 58 under the control of the horizontal blanking signal on lead 63, being applied to its load input. The initial value applied to counter 62, from latch 58, is such that overflow occurs at the desired point i.e. where the horizontal window boundary is desired to stop. The overflow signal from counter 61 on lead 64 is applied to the J-input of flip-flop 66. The overflow signal from counter 62 on lead 67 is applied to the K-input of flip-flop 66. The Q-output of flip-flop 66 on lead 68 is applied to one of the inputs of AND gate 56. The Q-output of flip-flop 66 on lead 68 is a logic 1, when a window is deemed to exist, and a logic 0 when a window is deemed not to exist. Consequently, the output of AND gate 56 (on lead 59) is a logic 1 when a window exists, and a logic 0 when a window is deemed not to exist.

As an illustrative example, for a window of approximately 5 inches square, centered in the upper part of the display screen, the value stored in latch 46 would be FFA (in hexadecimal), the value stored in latch 47 would be FE6 (in hexadecimal), the value stored in latch 57 would be E1 (in hexadecimal), and finally, the value stored in latch 58 would be EA (in hexadecimal).

FIG. 3 depicts address selection circuit 69. The function of address selection circuit 69 is to select which address is applied to memory 21 (FIG. 1). In other words, is the address to be that for the non-window memory plane or is it to be the address for the window memory plane? Latch 71 (for example a Model 7474, manufactured by Motorola) receives a start address from microprocessor 11 (FIG. 1) via bus 37. This address in latch 71 is loaded into the non-window address counter 72, under the control of the vertical blanking signal, on lead 73, applied to the load input of counter 72. The outputs of counter 72 are the addresses for the non-window memory plane, i.e. plane 1 of FIG. 4. These are sixteen bit addresses and are applied, via bus 74, to the A input of multiplexer 76 (e.g. 74157).

Latch 77 receives a starting address from microprocessor 11 (FIG. 1) via bus 37. Window address counter 78 is loaded with the contents of latch 77 under the control of the vertical blanking signal on lead 79 applied to its load input. The output of counter 78 is a sixteen bit bus 81 containing the addresses for the information contained in the window 83 depicted in plane 2 of FIG. 4. Bus 81 is applied to the B-input of multiplexer 76. The output of multiplexer 76 is a sixteen bit bus 37 which carries addresses to memory 2 (FIG. 1). It should be noted that bus 37 is a bi-directional bus, and is the same bus that was depicted in FIGS. 1 and 2 as connecting window control circuit 36 to bus 12.

Clock A is a square wave having a frequency of 22.222 kilohertz (the same as the horizontal blanking signal). Clock B is a square wave having a frequency of 1.2376 megahertz and a period of 808 nanoseconds. The frequency of the vertical blanking signal on lines 44, 73, and 79 is 60 hertz. The vertical blanking signal has a rectangular waveshape and is low for 95.38 percent of a period. The frequency of the horizontal blanking signal on line 63 is 22.222 kilohertz (period of 45 microseconds). The waveshape of the horizontal blanking signal is a rectangular wave with the signal being low for 8O.357 percent of a period.

It should be noted that, in the above described embodiment, the boundary size of the window is incremented in discrete steps of sixteen pixels (picture elements) in the horizontal direction, and by one pixel in the vertical direction. If it is desired to adjust the window in the horizontal direction by other than steps of sixteen pixels, this can be done under the control of firmware. Firmware (i.e. software) is then used to transfer data from one memory plane to the other; i.e. if the window boundary were to be incremented in steps of eight pixels (instead of sixteen), then firmware would transfer the eight pixels of display information from one memory plane to the other. Scrolling of this boundary area (i.e. eight pixels wide) is also under the control of firmware so as to correspond to the scrolling in the window.

We claim:

1. A control circuit for producing an independent, scrollable display region on the face of a cathode-ray tube (CRT) in a bit-mapped data display system, said control circuit comprising:

a first vertical boundary detection means for detecting the beginning of said independent display region along a vertical axis;

a second vertical boundary detection means for detecting the finish of said independent display region along said vertical axis;

a first horizontal boundary detection means for detecting the beginning of said independent display region along a horizontal axis;

a second horizontal boundary detection means for detecting the finish of said independent display region along said horizontal axis;

control means responsive to said first and second vertical boundary detection means and to said first and second horizontal boundary detection means for producing a binary signal having a first value indicative of said independent display region existing and having a second value indicative of said independent display region not existing;

first memory address means for generating a sequence of addresses pertaining to said independent display region;

second memory address means for generating a sequence of addresses not pertaining to said independent display region; and memory address selection means for selecting, in response to said binary signal, either a memory address from said first memory address means pertaining to said independent display region or a memory address from said second memory address means not pertaining to said independent display region.

2. The control circuit of claim 1 wherein said control means comprises first and second flip-flops and an AND gate interconnected such that said first flip-flop is responsive to the signals from both said first vertical boundary detection means and said second vertical boundary detection means; said second flip-flop is responsive to the signals from both said first horizontal boundary detection means and said second horizontal boundary detection means; and said AND gate is responsive to the output signals from both said first and second flip-flops.

3. A method for producing an independent scrollable display region on the face of a cathode-ray tube (CRT) in a bit-mapped data display system, said method comprising:

producing a first binary signal having a first state indicative of said independent region existing along a first axis and having a second state indicative of said independent region not existing along said first axis;

producing a second binary signal having a first state indicative of said independent region existing along a second axis and having a second state indicative of said independent region not existing along said second axis;

combining said first and second binary signals so as to produce a third binary signal having a first state indicative of said independent region existing when both said first and second binary signals are in their first state and having a second state indicative of said independent region not existing when both said first and second binary signals are not both in their first state; and selecting either a first address source or a second address source in response to said third binary signal.

4. The method of claim 3 wherein said first state is a logic 1.

5. The method of claim 4 further including the movement, under software control, of data from a storage means accessed by said first address source to a storage means accessed by said second address source whereby fine control of the location of the horizontal boundary of the independent scrollable display region as displayed on the face of said CRT is achieved.

* * * * *